(12) United States Patent
Ferrari et al.

(10) Patent No.: US 7,328,783 B2
(45) Date of Patent: Feb. 12, 2008

(54) DEVICE FOR CONTROLLING A MASS OF CYLINDRICAL ARTICLES

(75) Inventors: Michele Ferrari, Bologna (IT); Stefano Negrini, Calderara di Reno (IT)

(73) Assignee: G.D. Societa" per Azioni, Bologna (IT)

( * ) Notice: Subject to any disclaimer, the term of this patent is extended or adjusted under 35 U.S.C. 154(b) by 0 days.

(21) Appl. No.: 11/415,761

(22) Filed: May 2, 2006

(65) Prior Publication Data

US 2006/0272926 A1 Dec. 7, 2006

(30) Foreign Application Priority Data

May 3, 2005 (IT) .......................... BO2005A0308

(51) Int. Cl.
*B65G 1/00* (2006.01)
(52) U.S. Cl. ..................... 198/347.1; 198/359; 198/572
(58) Field of Classification Search ............. 198/347.1, 198/359, 347.2, 347.3, 355, 572, 573, 779
See application file for complete search history.

(56) References Cited

U.S. PATENT DOCUMENTS

| | | | |
|---|---|---|---|
| 3,703,971 A | 11/1972 | Rowlands | |
| 4,349,096 A | 9/1982 | Thamerus | |
| 4,717,009 A * | 1/1988 | Carter et al. | 198/347.1 |
| 5,529,164 A * | 6/1996 | Meinke et al. | 198/347.2 |
| 6,065,585 A * | 5/2000 | Bryant et al. | 198/347.1 |
| 6,390,273 B1 * | 5/2002 | Muller | 198/347.1 |
| 6,540,061 B1 * | 4/2003 | Focke et al. | 198/359 |
| 6,666,321 B2 * | 12/2003 | Spatafora | 198/347.1 |
| 7,044,286 B2 * | 5/2006 | Sikora et al. | 198/347.1 |

FOREIGN PATENT DOCUMENTS

| | | |
|---|---|---|
| DE | 2549753 | 5/1977 |
| DE | 3333859 | 4/1984 |
| GB | 2133759 | 8/1984 |
| GB | 2188895 | 10/1987 |

\* cited by examiner

*Primary Examiner*—James R. Bidwell
(74) *Attorney, Agent, or Firm*—McCarter & English, LLP

(57) ABSTRACT

A device for controlling a mass of cigarettes, and having a conveyor system for feeding the cigarettes in bulk along a path from a cigarette manufacturing machine to a cigarette packing machine; and an operating unit for both determining and at least partly compensating differences between the cigarette production and packing rates; the operating unit having an arm with a number of articulated segments.

18 Claims, 2 Drawing Sheets

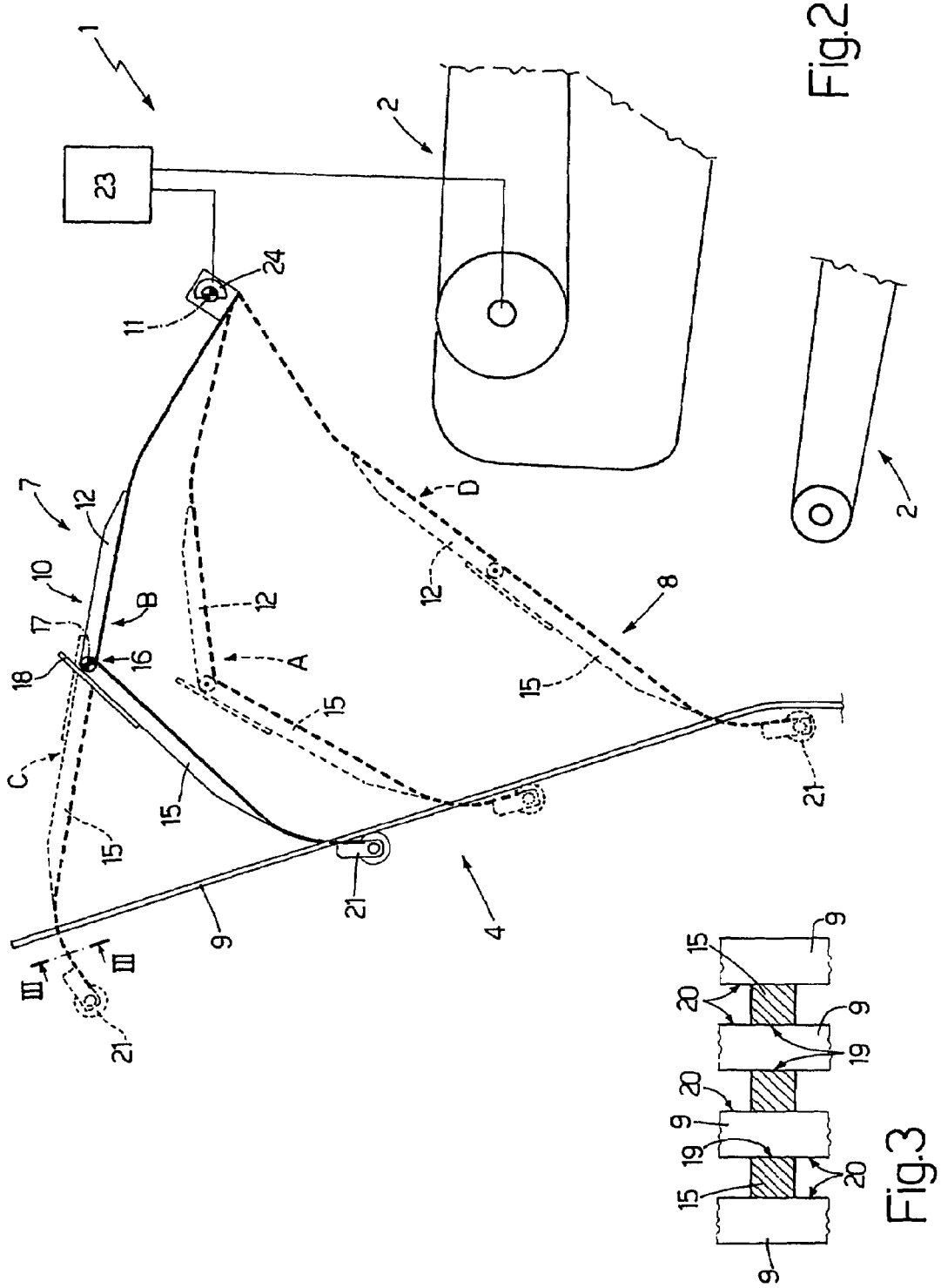

DEVICE FOR CONTROLLING A MASS OF CYLINDRICAL ARTICLES

The present invention relates to a device for controlling a mass of cylindrical articles.

More specifically, the present invention relates to a device for controlling a mass of cylindrical articles, and comprising conveying means for conveying the cylindrical articles transversely along a path from an input station to an output station via at least one intermediate station located between the input station and the output station. The device also comprises an operating unit located at the intermediate station to determine variations in the quantity of cylindrical articles along the path caused by differences between the number of cylindrical articles fed through the input station and unloaded through the output station.

In the following description, said cylindrical articles are considered cigarettes, purely by way of a non-limiting example.

BACKGROUND OF THE INVENTION

The device described above has the drawback of normally failing to effectively control relatively rapid variations in the quantity of cigarettes. In this respect, it is important to note that the device described above is often connected to a spiral compensating store, which has the advantage of relatively high maximum capacity, but the drawback of not always being able to compensate sharp differences in in-out quantities.

To eliminate the above drawbacks, Patent Application GB 2133759 proposes using a further compensating store smaller in size and capacity than the spiral store but capable of more rapidly compensating sharp variations in the quantity of cylindrical articles. The presence of an additional store, however, makes the device more complex and therefore more expensive to produce.

SUMMARY OF THE INVENTION

It is an object of the present invention to provide a device for controlling a mass of cylindrical articles designed to eliminate the aforementioned drawbacks, and which, in particular, is cheap and easy to produce.

According to the present invention, there is provided a device as claimed in the attached Claims.

BRIEF DESCRIPTION OF THE DRAWINGS

A non-limiting embodiment of the present invention will be described by way of example with reference to the accompanying drawings, in which:

FIG. 2 shows a larger-scale detail of the FIG. 1 device in different operating positions;

FIG. 3 shows a larger-scale section along line III-III of the FIGS. 1 and 2 device.

DETAILED DESCRIPTION OF THE INVENTION

Figure 1:
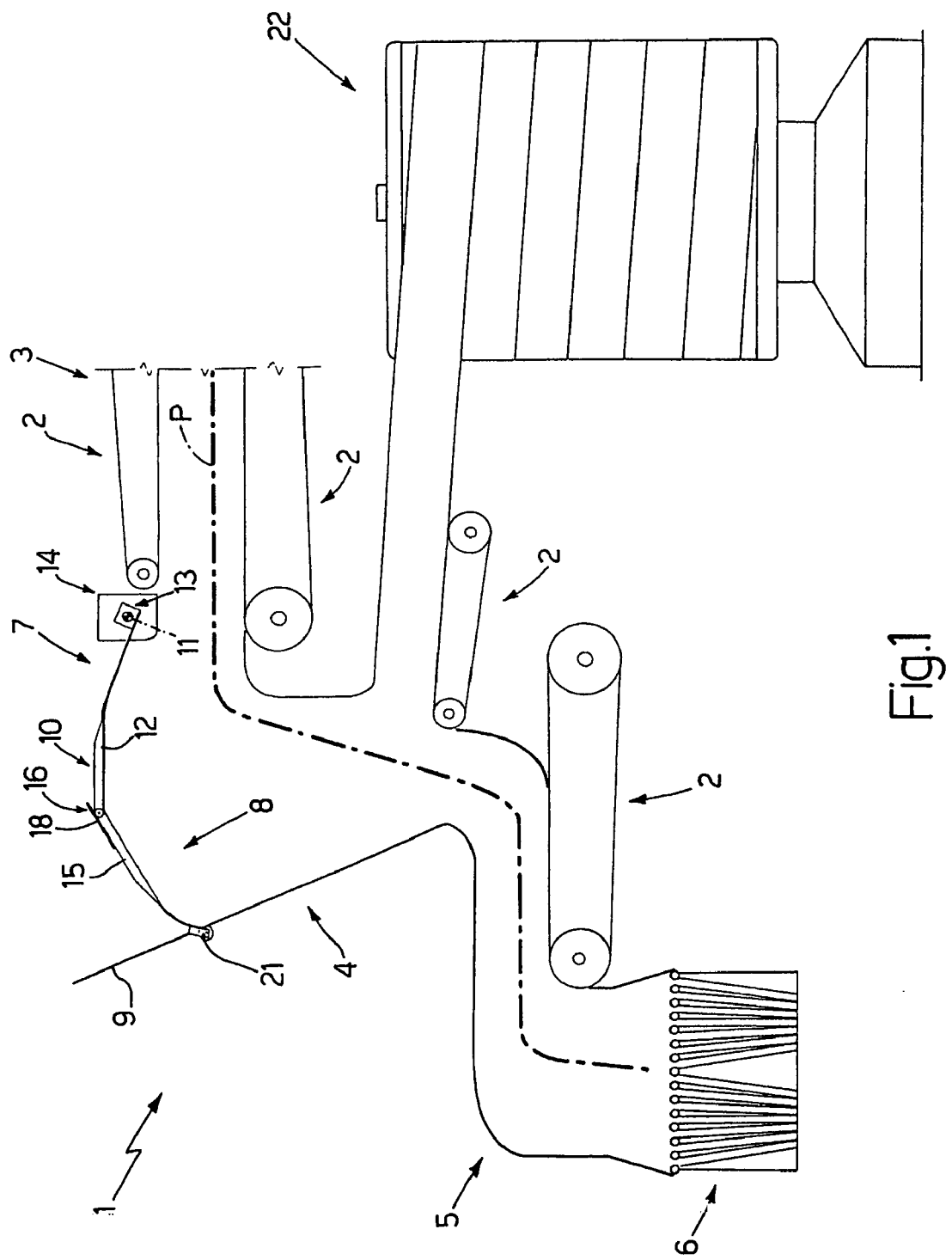
FIG. 1 shows a schematic view of a device in accordance with the present invention.

Number 1 in FIG. 1 indicates as a whole a device for controlling a mass of cigarettes (not shown). Device 1 comprises a conveyor system 2 for conveying the mass of cigarettes transversely along a path P from an input station 3—equipped with a manufacturing machine (not shown) for producing cigarettes (not shown)—through an intermediate station 4—located at a curved portion of path P—to an output station 5—equipped with a packing machine, of which a cigarette hopper 6 is shown.

Device 1 also comprises an operating unit 7 located at intermediate station 4 to determine variations in the quantity of cigarettes along path P caused by differences between the number of cigarettes fed onto path P by the manufacturing machine (not shown) and the number of cigarettes used up by the packing machine.

Operating unit 7 comprises a variable-volume store 8 bounded laterally by a fixed wall 9 and at the top by a movable arm 10. Arm 10 rotates about an axis 11 substantially parallel to the cigarettes (not shown) along path P, and comprises a segment 12 hinged by an articulation 13 to a frame 14 (shown partly) of device 1, and a segment 15 hinged by an articulation 16 to segment 12 to rotate about an axis 17 (FIG. 2) substantially parallel to axis 11. Frame 14 supports conveyor system 2.

Articulation 16 comprises a projection 18 integral with segment 15, and which extends from segment 15 to a point beyond axis 17 to limit upward rotation of segment 15 about axis 17 by engaging a top surface of segment 12.

With reference to FIG. 3, at the opposite end to articulation 16, segment 15 has a number of substantially parallel slits 19.

Wall 9 also has a number of slits 20 substantially parallel to slits 19; and wall 9 and segment 15 are positioned and designed to penetrate mutually. That is, arm 10 extends from axis 11 to a point beyond wall 9 and through wall 9.

With particular reference to FIG. 2, arm 10 also comprises a sliding member 21 (more specifically, a small wheel) located in a fixed position along segment 15, on the opposite side of wall 9 to axes 11 and 17, and which limits downward rotation of segment 15 about axis 17 by coming to rest on, and sliding along, wall 9.

Device 1 also comprises a known spiral compensating store 22 (FIG. 1) of relatively high capacity greater than that of store 8.

Finally, device 1 comprises a control unit 23 (shown schematically in FIG. 2) connected to operating unit 7, to conveyor system 2, and to compensating store 22 (the connection between control unit 23 and compensating store 22 is not shown), and which regulates operation of conveyor system 2 and of compensating store 22 on the basis of variations in the quantity of cigarettes (not shown) along path P as determined by operating unit 7. More specifically, control unit 23 is connected to a sensor 24 (e.g. a potentiometer or encoder) of operating unit 7, and sensor 24 is in turn connected to segment 12 at axis 11 to measure rotation of segment 12 about axis 11.

Operation of device 1 will now be described as of a balanced condition, i.e. in which the number of cigarettes (not shown) fed by the manufacturing machine (not shown) through input station 3 substantially equals the number of cigarettes (not shown) transferred from path P to the packing machine (shown partly) through output station 5.

In the above condition, arm 10 remains in a substantially fixed position (e.g. position A shown by the dash line in FIG. 2), conveyor system 2 operates at substantially constant speed, and compensating store 22 remains idle.

When the number of cigarettes (not shown) fed through input station exceeds the number of cigarettes (not shown) transferred through output station 5, arm 10 moves up to allow an increase in the volume of cigarettes inside store 8. More specifically, segment 12 rotates upwards about axis 11, possibly into a maximum-rotation position B shown by the continuous line in FIG. 2 and defined by stop members (not shown). If the cigarettes (not shown) along path P continue increasing, segment 15 rotates upwards about axis 17 until it reaches a maximum-rotation position C shown by the dash line in FIG. 2; at which point, store 8 is filled to capacity.

It should be pointed out that, as long as segment 12 rotates about axis 11, sliding member 21 rolls along wall 9 to limit downward rotation of segment 15 about axis 17. When arm 10 reaches position B and store 8 continues filling up, sliding member 21 is detached from wall 9 by rotation of segment 15 about axis 17.

When the number of cigarettes (not shown) transferred through output station 5 exceeds the number of cigarettes (not shown) fed through input station 3, arm 10 moves down alongside the outflow of cigarettes (not shown) from store 8. More specifically, segment 12 rotates downwards about axis 11, possibly into a minimum-rotation position indicated D and shown by the dash line in FIG. 2. It should be pointed out that, even when arm 10 is in position D, the mass of cigarettes (not shown) can still be fed along path P. In other words, arm 10 in position D does not completely obstruct the passage from input station 3 to output station 5.

As segment 12 rotates about axis 11, sensor 24 transmits a signal to control unit 23, which, in known manner, accordingly regulates the speed of conveyor system 2 and possibly activates compensating store 22. More specifically, when segment 12 rotates upwards, the speed of the conveyors upstream from intermediate station 4 is reduced, and the speed of the conveyors downstream from intermediate station 4 is increased. Conversely, when segment 12 rotates downwards, the speed of the conveyors upstream from intermediate station is increased, and the speed of the conveyors downstream from intermediate station 4 is reduced.

By comprising an arm 10 with two articulated segments 12 and 15, operating unit 7 is able to compensate fairly substantial variations in the quantity of cigarettes (not shown) along path P, and allows relatively gradual flow of the cigarettes to and from store 8, thus reducing potential damage of the cigarettes (not shown).

In this respect, it is important to note that compensating store 22 is only activated by control unit 23 upon sensor 24 indicating relatively sharp variations and/or when store 8 is almost completely full and/or completely empty.

Though the above description relates to controlling cigarettes, device 1 may obviously be used to advantage for controlling other cylindrical articles, such as cigars and/or filters.

The invention claimed is:

1. A device for controlling a mass of cylindrical articles and comprising:
    conveying means (2) for feeding the cylindrical articles transversely along a path (P) from an input station (3) to an output station (5) via at least one intermediate station (4) located between the input station (3) and the output station (5); and
    at least one operating unit (7) located at the intermediate station (4) to determine variations in the quantity of cylindrical articles along the path (P) caused by differences between the number of cylindrical articles fed through the input station (3) and the number of cylindrical articles unloaded through the output station (5);
    wherein the operating unit (7) comprises a variable-volume store (8) and a substantially fixed boundary member (9) laterally bounding said store (8), and an arm (10) which is movable to adjust the volume of the store (8); the arm (10) rotating about a first axis (11) substantially parallel to the cylindrical articles along the path (P), and comprising a first segment (12), and at least a second segment (15) hinged to the first segment (12) to rotate about a second axis (17) substantially parallel to the first axis (11); and wherein the arm (10) extends from said first axis (11) to a point beyond said boundary member (9).

2. A device as claimed in claim 1, wherein the path (P) comprises at least one curved portion; the operating unit (7) being located at the curved portion.

3. A device as claimed in claim 1, and comprising a frame (14) supporting said conveying means (2); the operating unit (7) comprising a first articulation (13) by which said first segment (12) of the arm (10) is hinged to the frame (14) to rotate about said first axis (11).

4. A device as claimed in claim 1, and comprising limiting means (18; 21, 9) for limiting rotation of the first and second segment (12, 15) about the first and second axis (11, 17) respectively.

5. A device as claimed in claim 1, wherein the arm (10) comprises a second articulation (16) in turn comprising a projection (18) integral with said second segment (15) and extending from the second segment (15) to a point beyond the second axis (17) to limit rotation of the second segment (15) about the second axis (17).

6. A device as claimed in claim 1, wherein the arm (10) comprises sliding means (21) for sliding the arm (10) along the boundary member (9).

7. A device as claimed in claim 6, wherein the sliding means (21) are located in a fixed position along the arm (10), on the opposite side of the boundary member (9) to the first axis (11).

8. A device as claimed in claim 6, wherein the sliding means (21) comprise at least one rotary member (21) which rotates on a surface of the boundary member (9).

9. A device as claimed in claim 1, wherein the second segment (15) and the boundary member (9) are positioned and designed to penetrate mutually and to slide with respect to each other.

10. A device as claimed in claim 9, wherein the boundary member (9) comprises a number of substantially parallel first slits (20); and said second segment (15) comprises, at least at the end opposite the second axis (17), a number of second slits (19) substantially parallel to the first slits (20).

11. A device as claimed in claim 1, and comprising a compensating store (22) for further compensating said differences.

12. A device as claimed in claim 11, wherein said compensating store (22) has a maximum capacity greater than a maximum capacity of said operating unit (7).

13. A device as claimed in claim 11, wherein said compensating store (22) is a spiral store.

14. A device as claimed in claim 11, and comprising a control unit (23) connected to the operating unit (7) to regulate said compensating store (22) as a function of the findings of the operating unit (7).

15. A device as claimed in claim 1, and comprising a control unit (23) connected to the operating unit (7) to regulate said conveying means (2) as a function of the findings of the operating unit (7).

16. A device for controlling a mass of cylindrical articles and comprising:
    conveying means (2) for; feeding the cylindrical articles transversely along a path (P) from an input station (3) to an output station (5) via at least one intermediate station (4) located between the input station (3) and the output station (5); and at least one operating unit (7) located at the intermediate station (4) to determine variations in the quantity of cylindrical articles along the path (P) caused by differences between the number of cylindrical articles fed through the input station (3) and the number of cylindrical articles unloaded through the output station (5);

wherein the operating unit (7) comprises a variable-volume store (8), and an arm (10) which is movable to adjust the volume of the store (8); the arm (10) rotating about a first axis (11) substantially parallel to the cylindrical articles along the path (P), and comprising a first segment (12), and at least a second segment (15) hinged to the first segment (12) to rotate about a second axis (17) substantially parallel to the first axis (11);

wherein the arm (10) comprises a second articulation (16) in turn comprising a projection (18) integral with said second segment (15) and extending from the second segment (15) to a point beyond the second axis (17) to limit rotation of the second segment (15) about the second axis (17).

17. A device as claimed in claim 16, and comprising a frame (14) supporting said conveying means (2); the operating unit (7) comprising a first articulation (13) by which said first segment (12) of the arm (10) is hinged to the frame (14) to rotate about said first axis (11).

18. A device as claimed in claim 16, and comprising limiting means (18; 21, 9) for limiting rotation of the first and second segment (12, 15) about the first and second axis (11, 17) respectively.

* * * * *

UNITED STATES PATENT AND TRADEMARK OFFICE
CERTIFICATE OF CORRECTION

PATENT NO. : 7,328,783 B2
APPLICATION NO. : 11/415761
DATED : February 12, 2008
INVENTOR(S) : Michele Ferrari and Stefano Negrini It is certified that error appears in the above-identified patent and that said Letters Patent is hereby corrected as shown below:

On the Title Page, Item (73), the Assignee should read as follows:

-- Assignee: G.D Societa' per Azioni, Bologna (IT) --

Signed and Sealed this

Seventeenth Day of August, 2010

David J. Kappos
*Director of the United States Patent and Trademark Office*